United States Patent [19]

Gill et al.

[11] Patent Number: 5,200,018
[45] Date of Patent: Apr. 6, 1993

[54] RIBBONIZING APPARATUS FOR INDIVIDUALLY HEATING A PLURALITY OF LATERALLY ADJACENT TOWS IN A FIBER PLACEMENT DEVICE

[75] Inventors: Dee R. Gill, St. Louis, Mo.; James P. Neilsen, West Valley City; Noel I. Shepherd, Grantsville; William J. Weis; John A. Johnson, both of Magna; Kazutoshi Fujimoto, Layton, all of Utah

[73] Assignee: Hercules Incorporated, Wilmington, Del.

[21] Appl. No.: 630,217
[22] Filed: Dec. 19, 1990
[51] Int. Cl.$^5$ .................. B65H 81/00; B32B 31/12; B32B 31/26
[52] U.S. Cl. .................. 156/359; 156/361; 156/425; 156/441; 156/499; 156/574; 156/523
[58] Field of Search ............. 156/166, 172, 169, 173, 156/523, 574, 499, 320, 425, 433, 441, 435, 428, 359, 361

[56] References Cited

U.S. PATENT DOCUMENTS

| | | |
|---|---|---|
| 2,683,105 | 7/1954 | Forbes et al. . |
| 3,313,670 | 4/1967 | Sherwood . |
| 3,499,815 | 3/1970 | Hof . |
| 3,574,040 | 4/1971 | Chitwood et al. ............ 156/468 X |
| 3,616,070 | 10/1971 | Lemelson . |
| 3,616,078 | 10/1971 | Howard . |
| 3,723,157 | 3/1973 | Druin . |
| 3,737,352 | 6/1973 | Avis et al. . |
| 3,796,624 | 3/1974 | Avis et al. . |
| 3,819,461 | 6/1974 | Saffadi . |
| 3,970,831 | 7/1976 | Hegyi . |
| 4,145,740 | 3/1979 | McClean et al. . |
| 4,221,619 | 9/1980 | Lemons . |
| 4,292,108 | 9/1981 | Weiss et al. . |
| 4,456,495 | 6/1984 | Doellinger et al. . |
| 4,530,733 | 7/1985 | Doellinger et al. . |
| 4,610,402 | 9/1986 | Corbett et al. . |
| 4,790,898 | 12/1988 | Woods . |
| 4,797,172 | 1/1989 | Hebert et al. . |
| 4,822,444 | 4/1989 | Weingart et al. . |
| 4,867,834 | 9/1989 | Alenskis et al. . |
| 4,877,471 | 10/1989 | McCowin et al. . |
| 5,015,326 | 5/1991 | Frank . |
| 5,022,952 | 6/1991 | Vaniglia . |
| 5,045,147 | 9/1991 | Benson et al. ............ 156/433 X |
| 5,078,592 | 1/1992 | Grimshaw et al. . |

FOREIGN PATENT DOCUMENTS 2579130 9/1986 France .
61-160836 7/1986 Japan .
90/07428 7/1990 PCT Int'l Appl. .

OTHER PUBLICATIONS

Evans, Don O., et al, "Fiber Placement Process Study," SAMPE 34th Symposium Book of Proceedings, May 8-11, 1989, pp. 1-12.
Grimshaw, et al. "Automated Tape Layup of a BMI Vertical Stabilizer Skin"; 15-17 Sep. 1987, pp. 173-182.
Klein, "Automated Tape Laying", *Advanced Composites*, Jan./Feb. 1989, pp. 44-52.
Cincinnati Milacron, "Into The Future . . . With Better Ways to Automate the Manufacture of Composite Parts".
D. V. Rosato et al., "Filament Winding: its development, manufacture, applications, and design", pp. 103-109 (Intersicence Publishers 1964).
M. E. Rosheim, "A New Pitch-Yaw-Roll Mechanical Robot Wrist Activator", Jun. 1985.
R. Merritt, "Industrial Robots: Getting Smarter all the Time", p. 32 Jul. 1982.
Milacron Today, "Fiber Placement: Automating Complex Composite Parts Processing", vol. 4, No. 6 (Jun. 1989).
The Ingersoll brochure "Automated Machinery for Composite Manufacturing" 1989.

*Primary Examiner*—Jeff H. Aftergut
*Attorney, Agent, or Firm*—David Edwards; Mark D. Kuller

[57] ABSTRACT

A ribbonizing apparatus and method for forming a fiber band from a plurality of fiber tows extending along respective fiber tow pathways. The ribbonizing apparatus includes an assembly for selectively heating at least a respective one of the plurality of fiber tows as the fiber tow extends along the fiber pathways. When not needed, the heat is removed from the fiber tow. A plurality of embodiments for accomplishing the method are contemplated.

29 Claims, 8 Drawing Sheets

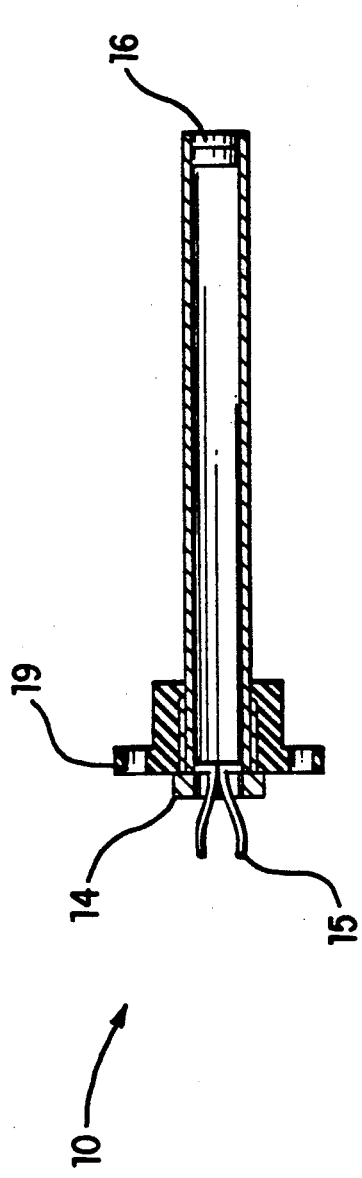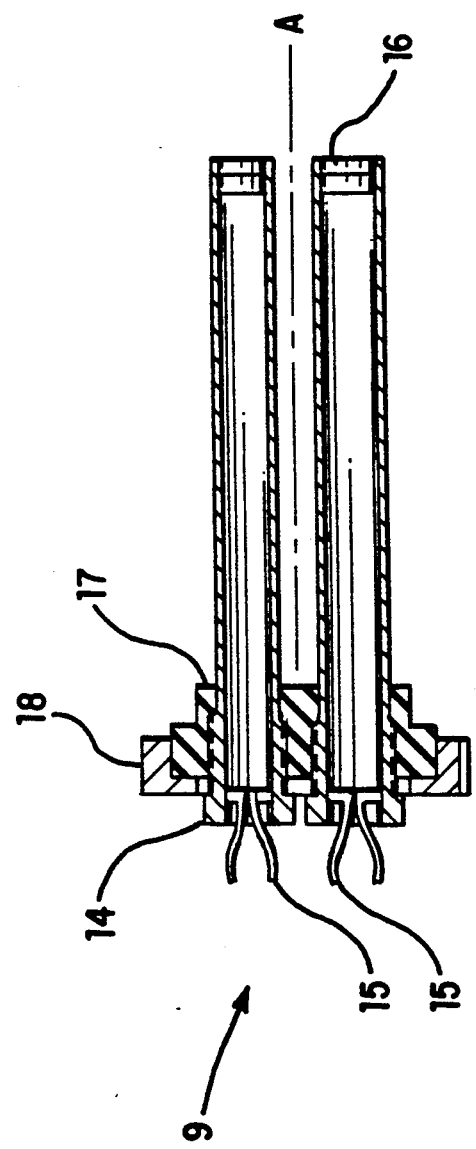

RIBBONIZING APPARATUS FOR INDIVIDUALLY HEATING A PLURALITY OF LATERALLY ADJACENT TOWS IN A FIBER PLACEMENT DEVICE

BACKGROUND OF THE INVENTION

1. Field of the Invention

The present invention is related to composite structures manufacturing methods and apparatus for practicing such methods. More particularly, the present invention is directed to a method and apparatus for making pre-impregnated multi-filament tows or rovings into a flat ribbon of predetermined thickness and width that can be processed through a delivery head and placed onto a mandrel surface for forming tubular articles.

2. Description of Background and Other Information

In present fiber placement systems, fibrous rovings or tows, impregnated with a thermosetting resin, are wound in a helical pattern in a number of superimposed layers onto a mandrel to produce a tubular article.

Various methods are known in the art of manufacturing composite structures, including hand lay-up, automated tape lay-up, filament winding, and fiber placement.

The present invention applies to the area of fiber placement. Examples of such systems can be found in U.S. Pat. Nos. 4,699,683 and 4,877,471, assigned to Boeing Company, Seattle, Wash. In addition, commonly assigned copending application Ser. No. 07/275,313, filed Nov. 23, 1988, now U.S. Pat. No. 5,045,147, discloses a fiber placement system.

SUMMARY OF THE INVENTION

An object of the present invention is to improve the processes in which pre-impregnated multi-filament tows, or rovings, are used. The improvements particularly are directed to the manner of controlling the ply thicknesses and widths of the tape lay-up.

The following four mechanisms are utilized in a method and apparatus for forming a ribbon from a plurality of fiber tows:

a spacing device;
a heating device;
a spreading device; and
a cooling device.

Five alternative embodiments are described which improve the ribbonizing process, viz., a three bar system (used primarily within the delivery heads), a tow lift system, a bi-metallic system, and two independent zone systems.

In the first embodiment, referred to as the three bar system, the spreading device comprises a series of hollow metal tubes with high thermal conductive properties, such as yellow brass or copper. The external surfaces of the tubes are coated with wear-resistant material such as industrial chrome or other synergistic coating. In the center of the tubes a resistance cartridge heater is placed. The temperature is monitored with the use of thermocouples and they are plugged into a temperature controller. As the cartridge is heated, the tubes heat as well. When the fiber tows pass over the heated surface of the tubes, the resin of the tows become hot and fluid, thereby allowing the bundle of multi-filament rovings to spread out. By altering the surface area and the amount of heat to which the rovings are exposed, the thickness and amount of spread can be controlled.

Once the individual tows are spread to the desired width and thickness, they are delivered to the cooling device. This device cools the resin in the tows back to the solid state, thus keeping the spread tow at the proper Width and thickness. The cooling device comprises a good thermal conductive metal, such as yellow brass or copper. A cooling gas is applied to the surface area of the cooling device as the fiber tows pass over the metal surface.

In the first embodiment, referred to as the three tube ribbonizing system, a pair of double heater tubes are employed which are adjacent to a single heater tube. The fiber tows are weaved alternately over and under the three tubes. In a particular aspect of this embodiment, the surface area of the tubes against which the tows are applied can be adjusted by mounting the double heater tubes for rotation about an axis extending lengthwise between the tubes. In an alternative to this, the middle heater tube of the three tubes is mounted for reciprocation toward and between the other two tubes.

In a second embodiment, referred to as the tow lift system, means are provided to accommodate independent tow cutting and adding in a fiber delivery head as disclosed in application Ser. No. 07/275,313, filed Nov. 23, 1988, now U.S. Pat. No. 5,045,147, and application Ser. No. 07/630,083, filed De. 19, 1990, filed concurrently herewith, the disclosures of both of which are hereby incorporated by reference thereto in their entireties. When a tow is cut from the band, the tows remain in contact with the heated bars, or tubes, of the ribbonizer. It is preferable to remove the stationary tows from contact with the heated tubes at that time.

As in the above-mentioned first embodiment, three heater tubes are utilized in the second embodiment. However, in the second embodiment, the ribbonizing of each individual tow is independent of the other tows. Each tow has an actuation device such as an electric solenoid or pneumatic cylinder that actuates a rack and gear to raise the tows and make contact therewith with the ribbonizing bars. Such actuation can be selective by means of computer control. The entry spacing, tube heating, and tow cooling can be the same as that described with reference to the first embodiment. The tube that houses the heater is segmented so that individual rotation for each tow is possible.

In a third embodiment, referred to as the bi-metallic system, individual tow cutting and adding is also accommodated. The ribbonizing actuator of this embodiment is two dissimilar metals bonded together. One metal acts as the heat source, and the other as the actuator. As power is applied, the metals heat, expand, and lengthen. With the material being assembled in an arc, the arc grows and presses the metals against a respective individual fiber tow. Between the heat of the metal and the pressure of the metal expanding, the tow is spread to a desired width and thickness.

In a fourth embodiment, again individual heaters are provided for the individual fiber tows. The heating element is wrapped around an insulator and has an abrasive resistant conductor placed over the heating element. The fiber tow passes over the conductor surface and is spread, as required. When the tow is required, its respective heater has power applied. When the tow is cut and remains stationary, the heater is turned off.

In a fifth embodiment, the tube, heating element, and abrasion resistance surface comprises one integral unit. The base is a machined ceramic that forms the tube and the conductor wire is wrapped around it. The leads of the wire are connected to a power supply and controller. An insulator is placed around the conductor with the abrasive resistance coating over the insulator surface. The ribbonizer is then used in the same manner as described with reference to the three tube ribbonizing system.

In view of the foregoing description, the ribbonizing apparatus, according to the present invention, can be defined as including:

(a) means defining a plurality of pathways for the plurality of fiber tows; and (b) means for selectively heating respective ones of the plurality of fiber tows as the fiber tows extend along respective ones of the pathways.

Specifically according to the invention, the fiber tows have a predeterminate width and thickness, and the means for selectively heating include (i) means for transferring heat to respective ones of the plurality of fiber tows for controlling the width and the thickness of the fiber tows and (ii) means for terminating heat transfer to the respective ones of the plurality of fiber tows.

More specifically, the means for selectively heating include means for effecting selective contact of the fiber tows with a source of heat.

Further, the means for effecting selective contact of the fiber tows include means for moving selective ones of the fiber tows, in a direction transverse to the fiber tow path, for contact with the source of heat.

Still further, according to the invention, the plurality of fiber tows extend transversely of the fiber tow pathways, the source of heat include a heating bar extending transversely across the plurality of fiber tows, and the means for effecting selective contact include means for moving selective ones of the fiber tows for contact with the heating bar.

In a particular embodiment of the invention, the means for effecting selective contact of the fiber tows include respective cam members which are selectively rotatable for engaging and moving respective fiber tows toward the source of heat and away from the source of heat.

Further in accordance with this embodiment, the cam members have heat conductive portions for engaging the tows during movement of the respective fiber tows toward the source of heat, and have heat insulative portions for engaging the respective fiber tows when the fiber tows are removed from contact with the source of heat.

Still further, each of the cam members is in driving connection with a respective power actuator assembly for rotating the cam members. Each of the power actuator assemblies include a linear actuator, such as an air-actuatable cylinder device, or other suitable actuator. Further, each of the cam members has a toothed segment, and the power actuator assembly includes a rack member in engagement with a respective toothed segment for rotating a respective cam member.

More specifically according to this embodiment, a pair of cam members are provided for each of the fiber tows, spaced in the direction of a respective one of the fiber tow pathways, wherein the source of heat includes a heating element positioned between the pair of cam members and is adapted to be on an opposite side of the fiber tows from the pair of cam members.

In another embodiment of the invention, the means for effecting selective contact of the fiber tows include respective bi-metallic elements positioned adjacent respective ones of the fiber tow pathways.

Further according to this embodiment, each of the bi-metallic elements is connected to a source of power and is selectively heated for engaging respective fiber tows.

Still further, a positioning roller and a cooling roller are provided, which are spaced in the direction of the fiber tow pathways, wherein each of the bi-metallic elements is mounted in a bowed configuration projecting in a direction between the positioning roller and the cooling roller.

The ribbonizing apparatus, according to the present invention, can additionally be defined as including:

(a) means defining a predeterminate pathway for the plurality of fiber tows;

(b) at least one source of heat to which the plurality of fiber tows are exposed; and (c) means for selectively varying exposure of the fiber tows to the at least one source of heat.

Specifically, according to the invention, the means defining a plurality of pathways include a plurality of bars around which the fiber tows extend, at least one of the bars having a heating element affixed thereto.

According to a specific feature of the invention, the means for selectively varying exposure of the fiber tows to the at least one source of heat include means for moving one of the bars relative to others of the bars.

In a particular embodiment, the means for moving include means for linearly reciprocating the one of the bars. One or more of the bars can have a heat source affixed thereto.

More specifically according to this embodiment, three bars are provided, two being affixed to a base, wherein the means for linearly reciprocating the one of the bars including a slide in slidable cooperation with the base.

BRIEF DESCRIPTION OF THE DRAWING

The above and additional objects, characteristics, and advantages of the present invention will become apparent in the following detailed description of preferred embodiments, with reference to the accompanying drawing which is presented as a non-limiting example, in which:

FIG. 3 illustrates, in greater detail, the double bar assembly of FIG. 2;

FIG. 4 illustrates, in greater detail, the single bar assembly of FIG. 2;

DETAILED DESCRIPTION OF THE PREFERRED EMBODIMENTS

Figure 1:
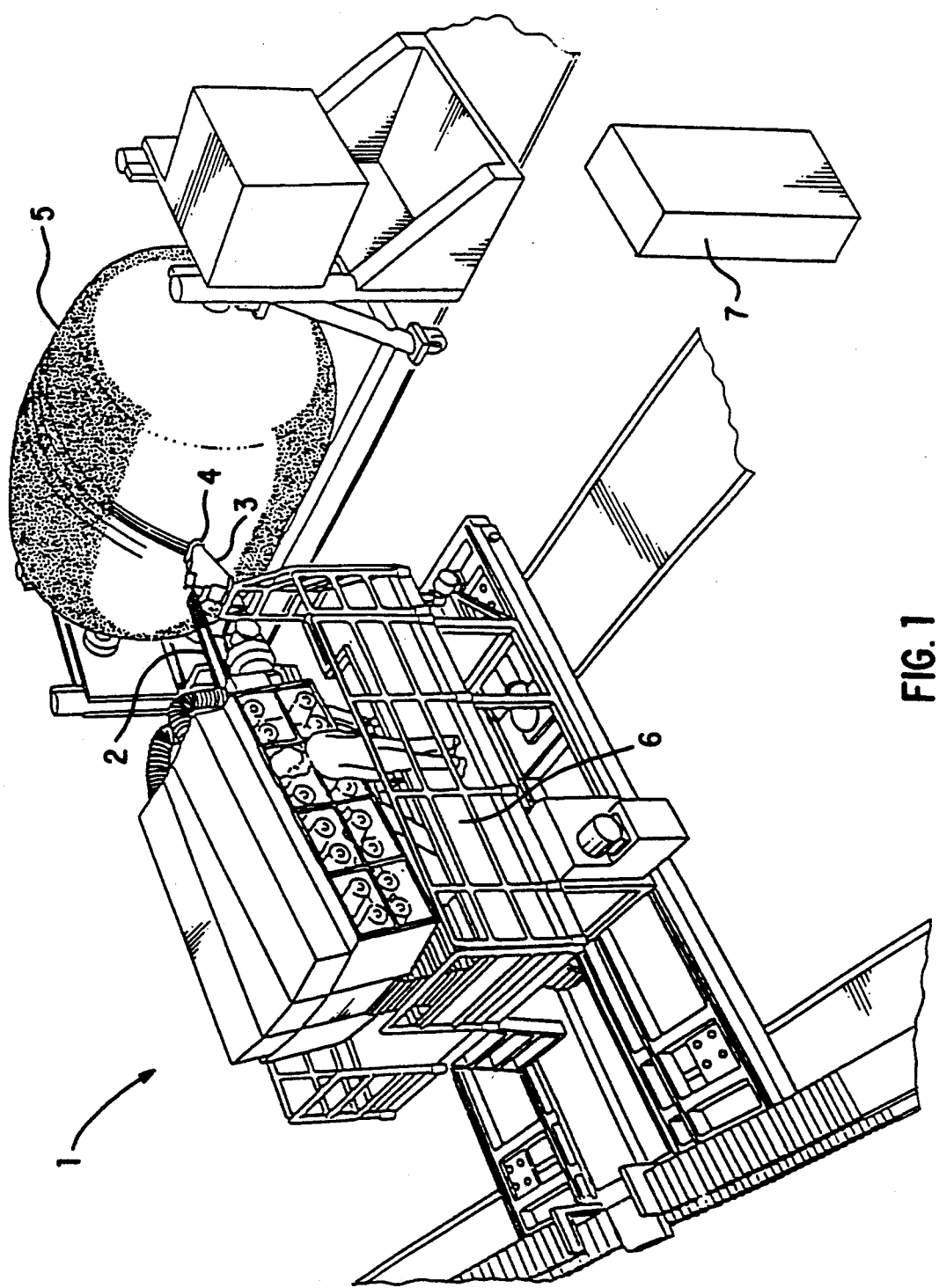
FIG. 1 is rear-side isometric view of a filament delivery system and a mandrel around which the filament is applied, thereby illustrating a typical fiber placement system.

FIG. 1 illustrates a filament placement system 1 in which individual rovings or tows 2 are directed to a delivery head 3, which is mounted onto a manipulator, and emerge at a delivery roller 4. The delivery roller applies the tows, formed into a band, onto a rotating mandrel 5. The fiber placement machine 6 includes a creel assembly for maintaining individual spools upon which the individual tows are wound, from which they are directed to the delivery head. Operation of the machine 6, including the delivery head 3, is controlled by a computer 7.

Within the delivery head 3, a ribbonizer assembly can be provided, although the ribbonizer can, if desired, be placed anywhere along the fiber path 2 between the creel and the delivery head. By placing the ribbonizer in the head, however, the fiber path is less complicated, particularly with regard to certain ply orientations such as low angle winding.

In general, in the ribbonizer, several individual multi-filament, resin-impregnated tows are routed through a series of heated, strategically positioned bars to form a serpentine path for the multi-filament tow. By adjusting the horizontal bars, the multi-filament tows are exposed to different wrap angles as they weave around the bars. Heat is applied to the bars as the fibers pass over them and spread the multi-filament fibers into a flat ribbon. By adjusting the heat and the wrap angle the tows are exposed to, the tow thickness and width can be controlled. When the tows are at a predetermined width and thickness, they are chilled to maintain these parameters.

Upon exiting the creel, the fiber tows extend toward the delivery head via a comb or other spacing device, such as redirect rollers or guide eyes, for example, which is placed at the inlet of the ribbonizing section to establish the proper tow spacing that will accommodate the delivery head required by the manufacturing processes. The spacing device blends together the individual pre-impregnated tows to form a tape quality band or keep each individual ribbonized tow separate. The winding surface geometry and delivery head dictate which spacing device is to be used.

Figure 2:
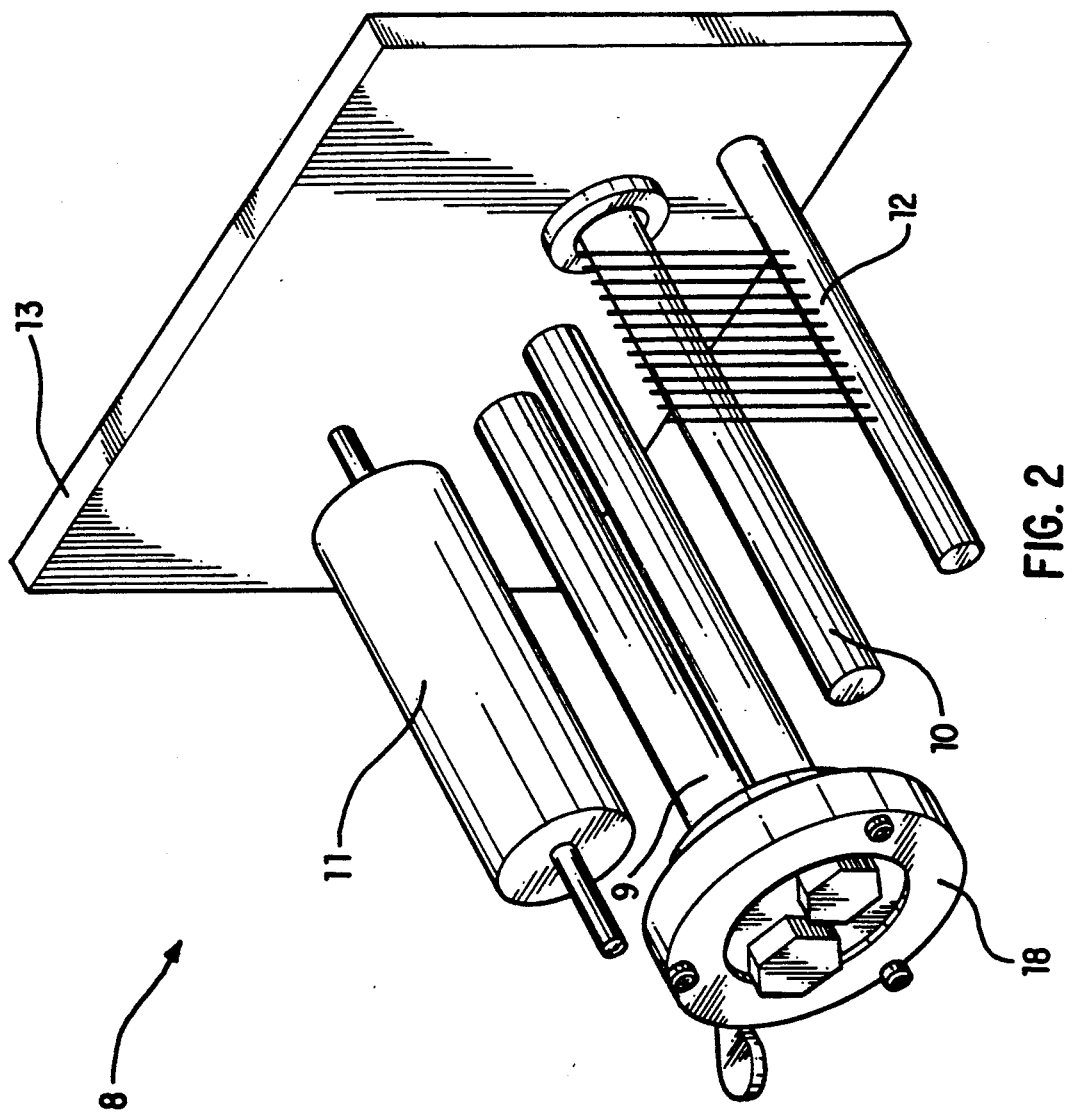
FIG. 2 illustrates, in an isometric view, the three bar ribbonizing system.

With specific reference to FIG. 2, a three bar embodiment is illustrated, in which the fiber tows enter the ribbonizer 8 through the tow positioning device 12. As shown, the positioning device is in the form of a comb. However, the positioning device is variable, depending upon which delivery head is to be used. For example, for band head winding, the tows would be positioned for forming a single blended together band, while the tow delivery head would position the tows to process individually each separate tow.

Once the position of the tows is set, the tows are weaved through a series of heated tube assemblies 9, 10. The tubes are fixed, i.e., they do not rotate about their longitudinal axes, so that the fiber slides over the tubes, thereby causing the fiber to spread out laterally. By applying heat and different wrap angles, the amount of spread changes and can be controlled with the use of the computer 7.

As shown in FIGS. 3 and 4, the tube assemblies 9, 10 are heated by means of cartridge heaters 15. The use of insulating materials 17, 19 ensures that the mounting bases are prevented from becoming unnecessarily hot and becoming a safety hazard.

FIGS. 3 and 4 illustrate two different types of ribbonizing assemblies which are intended for use in a delivery head in the form of a three tube system. FIG. 3 illustrates a double tube assembly 9, while FIG. 4 illustrates a single tube assembly 10. An insulator and mounting flange 19 is provided for mounting the tube 14 of the single tube assembly to the delivery head 3. Likewise, in the double tube assembly, an insulator and mounting flange 17 and an attachment ring 18 are provided for securing the double tube assembly to the delivery head 3. Snap rings 16 are inserted to plug the ends of the tubes and to secure the cartridge heaters 15 therein.

The fiber tows enter the ribbonizer assembly via the comb 12, or other tow positioning device, pass beneath the single tube assembly over the first of the double tubes and beneath the second of the double tubes.

In a variation of the first embodiment, by selectively rotating the double tube set 9 about a longitudinal axis A extending between the tubes 14 of the double tube set 9, the wrap angle of the fiber tow can be selectively adjusted to provide for a selective amount of spread. This design helps to maintain the delivery head 3 compact and still allows adjustment of the wrap angle of the fiber tow.

In a further variation of the three tube, or three bar, system, and described below in conjunction with FIG. 9, two outer tubes are positioned stationarily and the intermediate tube is mounted for movement up and down, i.e., toward and away from the two outer tubes. If the fiber tows are alternately weaved over and under the three successive tubes, by raising and lowering the intermediate tube, the wrap angle, i.e, the surface area of the tubes to which the individual fiber tows are exposed is selectively adjusted.

After the fibers have been spread to the desired width, they pass over a cold roller 11. With the use of the cold roller 11, the spread tow is chilled and the resin is set, thereby maintaining the tow at a constant ply thickness and a subsequent width.

FIGS. 5-8 illustrate alternative embodiments of ribbonizing for individual tow control. The entry, positioning, and cooling of the fiber tows can remain unchanged from that described above with regard to the embodiment of FIGS. 2-4. The differences are described below.

Figure 5A:
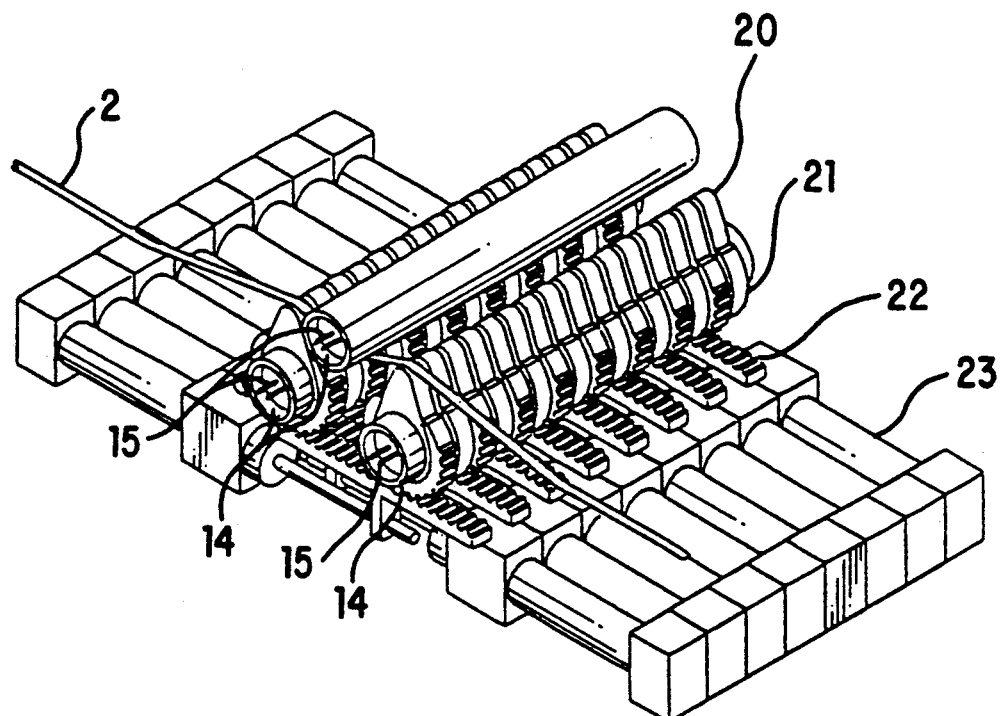
FIGS. 5a and 5b illustrates the tow lift system of the invention, FIG. 5a depicting an actuated position, and FIG. 5b depicting an unactuated position.
Figure 5B:
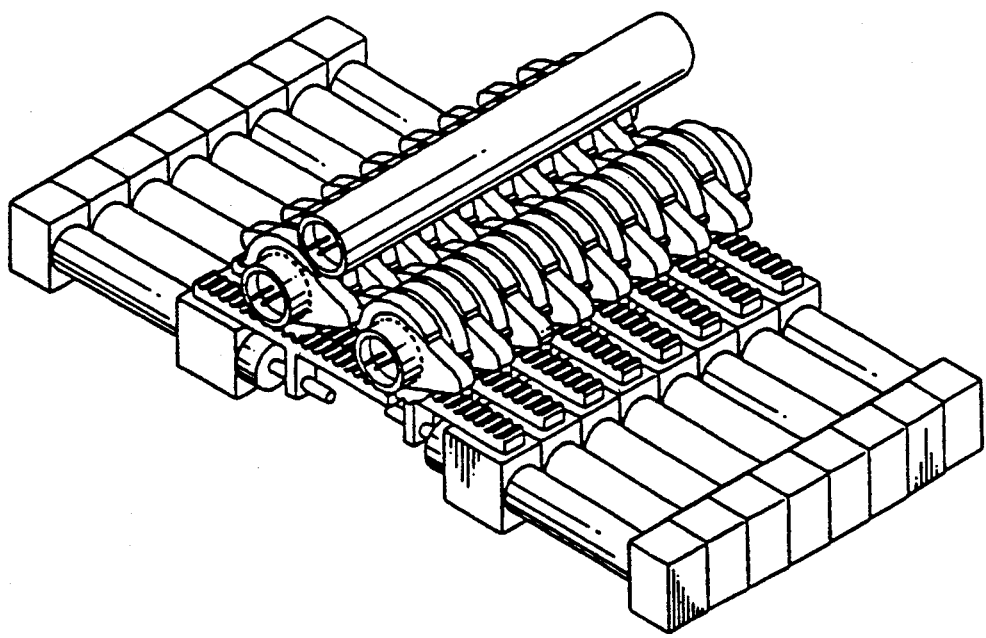

In the embodiment of FIGS. 5a and 5b, the ribbonizer consists of several thermally conductive cams 20 that are rotatable around the heated tube 14, which hold the cartridge heater 15. A respective insulating pinion 21, made of Torlon, e.g., holds each of the conductive cams 20 in place and mates with a respective rack 22. Respective air cylinders 23 or, alternatively, solenoids, actuate movement of the racks 22 in reciprocatory directions, thereby rotating the cams 20 which make contact with respective ones of the fiber tows 2, as needed. Random access control is provided via computer 7.

FIG. 5a depicts the ribbonizing position of the assembly, whereby the tow 2 is forced against the heat conductive cams 20 and into engagement with the upper heater tube 14. FIG. 5b depicts the unactuated, non-ribbonizing, position of the assembly, whereby the tow would not make contact with either of the heat conductive cams 20 or the upper heater tube 14.

Figure 6:
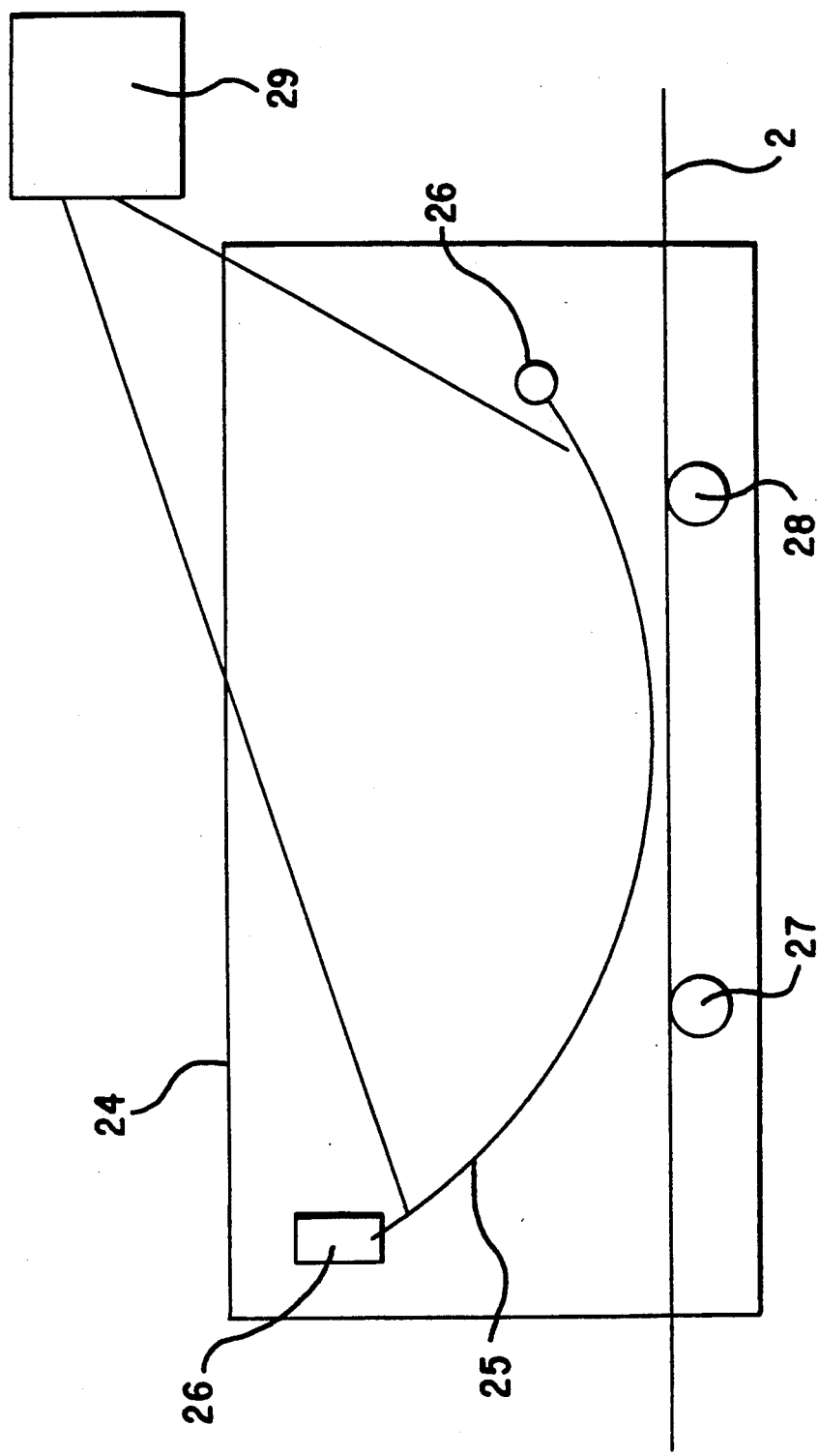
FIG. 6 illustrates the bi-metallic embodiment of the invention.

FIG. 6 illustrates a further embodiment of the invention. The fiber tows 2 extend along the various elements of the delivery head, as described above. In the embodiment shown in FIG. 6, an additional positioning roller 27 is provided, aligned with the positioning/cooling roller 28. A bi-metallic strip 25 is anchored to a mounting base 24 and is positioned above the rollers 27, 28. The bi-metallic strip 25 extends between two fixed attachment points 26, 26, between which the bi-metallic strip bows downwardly. The fiber tow 2 passes between the bi-metallic strip 25 and the rollers 27, 28.

The two rollers 27, 28 are positioned such that when the bi-metallic strip 25 expands, upon exposure to a heat source, the bowed bi-metallic strip, i.e., its tangent, is forced between the rollers 27, 28, thereby engaging and forcing the fiber tow 2 downwardly, making the tow spread. Power supply 29, schematically shown, is controlled by means of the computer 7 to cause the bi-metallic strip to expand.

The cooling roller 28 cools the fiber tow 2 in a manner described above. In this embodiment, however, the cooling roller 28 plays a double role by maintaining the fiber tow 2 in a straight line so that ribbonizing can take place, as well as providing its normal cooling function.

Figure 7:
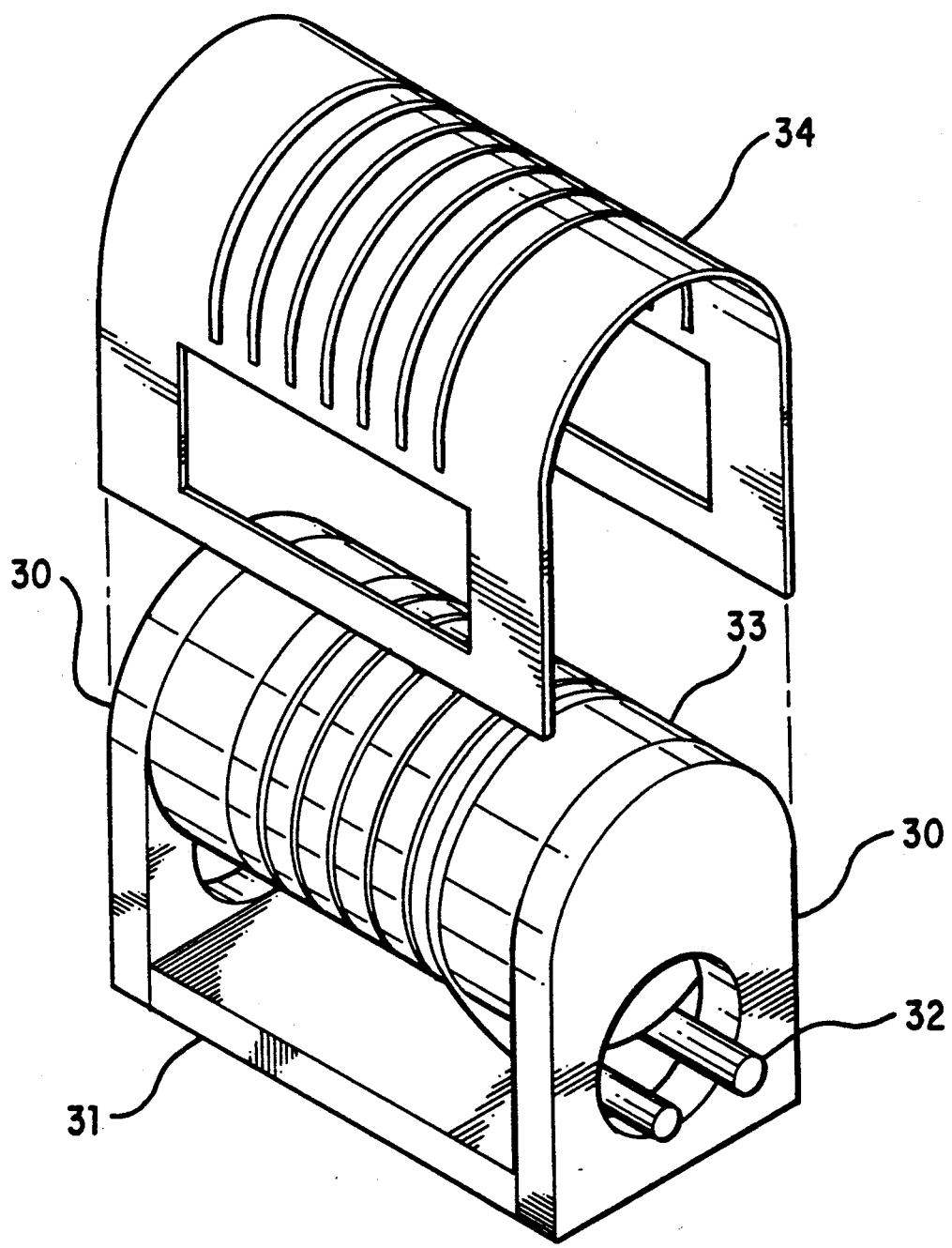
FIG. 7 illustrates a simplified zonal ribbonizing embodiment.

FIG. 7 illustrates a so-called "low-tech" means for independent tow ribbonizing. By means of separate heating elements, each tow 2 can be controlled independently. In this embodiment, an insulating base 33, made of Torlon, e.g., or other suitable material, is provided which has the resistance heating element 32 wrapped around it. An upper cover 34 comprises a conductive metal having an abrasive resistive coating. The insulating base extends between a pair of side plates 30, 30 and above a base plate 31 connecting the supports at its ends. The power to the heating elements 32 is controlled by means of the computer 7.

Figure 8A:
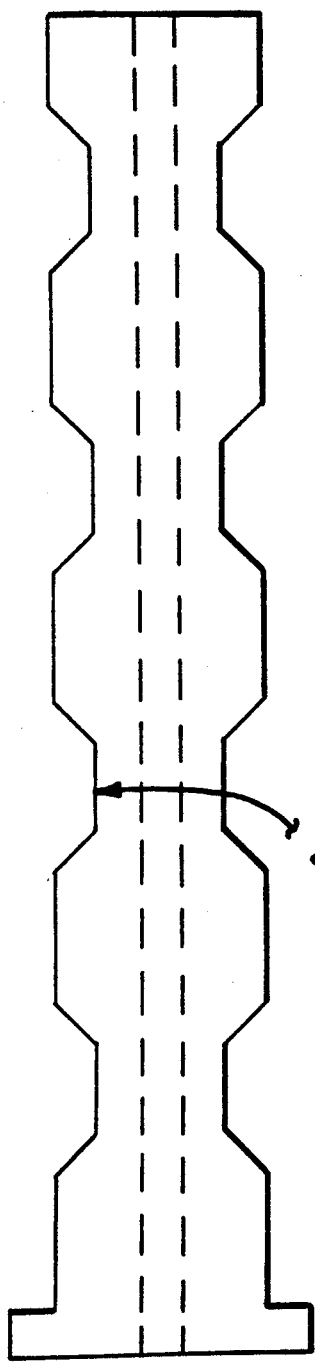
FIGS. 8A and 8B illustrate a high-tech zonal ribbonizing embodiment.
Figure 8B:
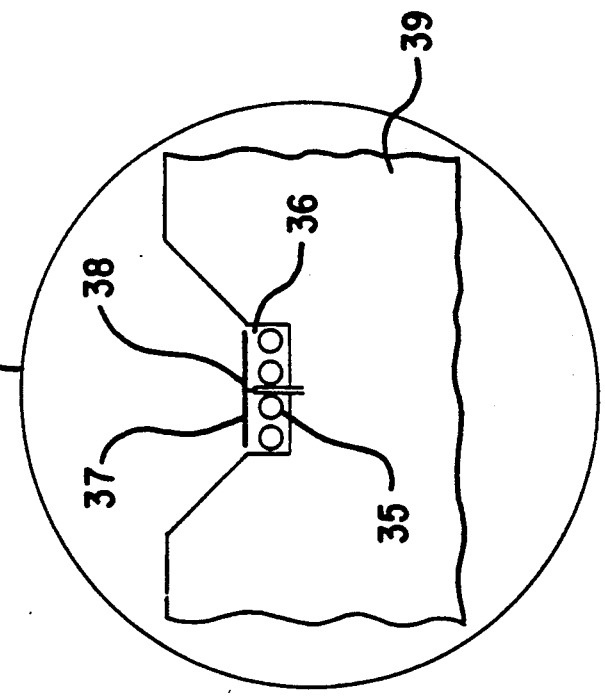

In FIG. 8, a so-called "high-tech" means for ribbonizing is illustrated. In this embodiment, a ceramic tube 39 is provided, having grooves for the respective fiber tows 2. In the bottom of each groove, a heating element is provided. The heating element comprises a wire 35 such as ni-chrome which is heated. An insulator 36 is provided to ensure that the wire does not short. A thermocouple 38 is implanted to monitor the heating. An abrasive resistance coating 37, of stainless steel, e.g., is placed over the wires 35 upon which the tows 2 pass over. The thermocouple 38 is linked to the computer 7 for providing the necessary control of the individual tow heating and cooling.

Figure 9:
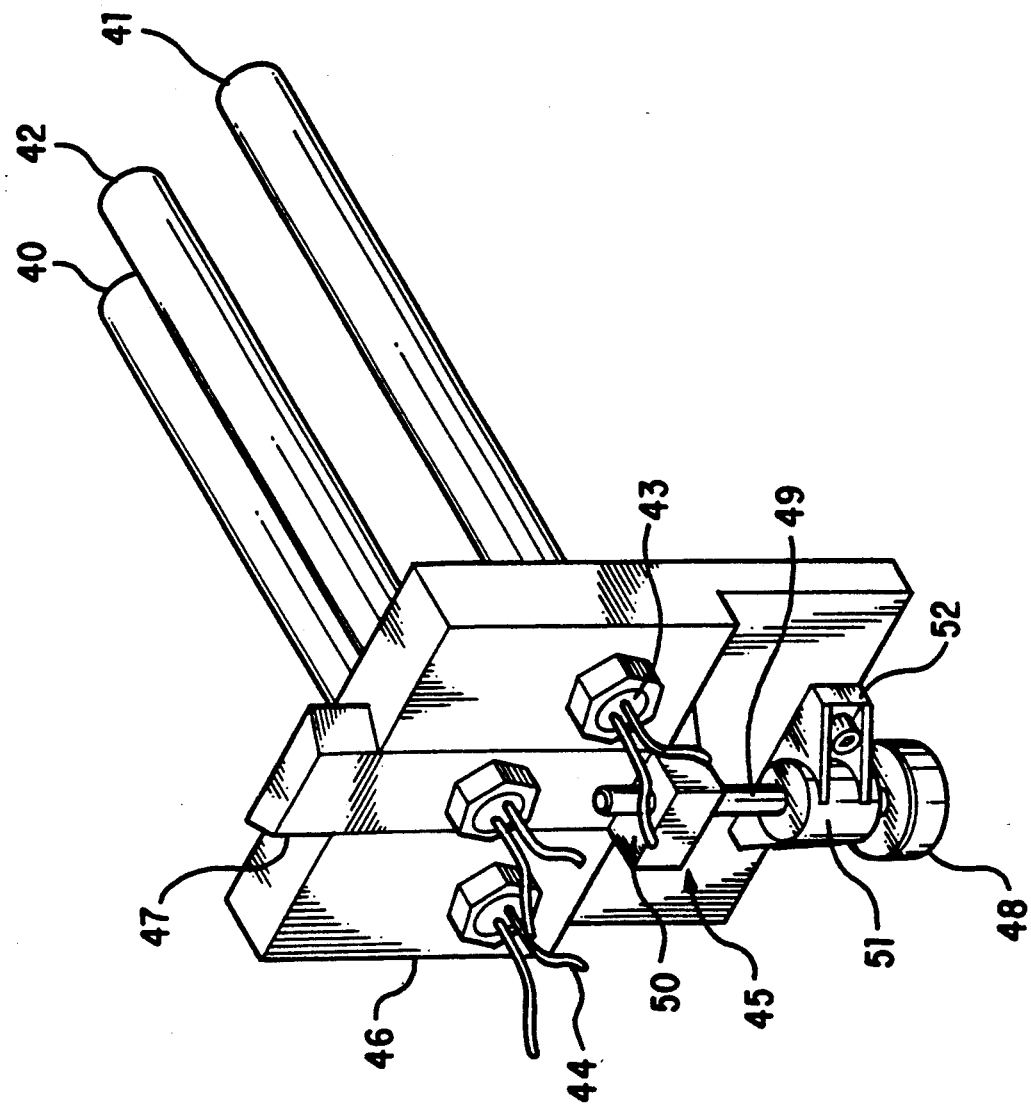
FIG. 9 illustrates, in an isometric view, a three bar ribbonizing system, which is an alternative embodiment to that of FIG. 2.

FIG. 9 illustrates a ribbonizer which is intended as an alternative embodiment to the three bar system described above in connection with FIGS. 2, 3, and 4. The three bars, or tubes, 40, 41, 42 are similar in construction to the bars or tubes 14, described above. For example, each has a cartridge heater 15 inserted therein, connectable to a suitable source of power through the electrical leads 44, and each includes appropriate insulating and mounting members. The fiber tows extend through the ribbonizer of FIG. 9 by being weaved alternately above and below the tubes 40, 41, 42.

To effect a variation in the wrap angle of the fiber tows in the ribbonizer of FIG. 9, the intermediate tube 42 is affixed to a reciprocating device 45, while the outer tubes 40, 41 are stationarily mounted to base 46. The reciprocating device 45 includes a slide 47, to which the intermediate tube is affixed. The slide 47 and base 46 are shown as having complementarily shaped dove-tail shapes, although other suitable slide configurations could be utilized, if desired.

Positioning of the slide member 47 and, therefore, intermediate tube 42, is preferably accomplished by means of an adjustment screw mechanism, having an enlarged finger wheel 48, which is affixed to a threaded shaft 49 which is threadedly engaged in an internally threaded flange 50, which projects from the slide 47. An end portion of the shaft 49, adjacent the finger wheel 48, is rotatably received within a bushing 51, the bushing being affixed to the base 46 by means of an appropriate flange 52.

If the operator of the fiber placement machine desires to adjust the wrap angle of the fiber tows which are weaved around the tubes 40, 41, 42, he/she merely rotates the finger wheel 48 which, by means of the threaded relationship between shaft 49 and flange 50, results in a linear movement of the slide 47 within the base 46. If the fiber tows, extending from a positioning device 12 (shown in FIG. 2), were to be weaved, e.g., beneath tube 41, above tube 42, and beneath tube 40, an upward movement of the slide 47 will result in an increase in the wrap angle, i.e., an increase in the contact area of the fiber tows with the tubes. Likewise, a downward movement of the slide 47 will result in a decrease in the wrap angle of the fiber tows.

It is possible that fewer than all three of the tubes 40, 41, 42 include heating elements 43. For example, only the reciprocatory tube 42 could include a heating element or, alternatively, only tubes 40, 41 could include respective heating elements. Nevertheless, by selective movement of the tube 42, the wrap angle of the fiber tows is correspondingly selectively varied.

Although the reciprocating device is described above as being embodied as including a threaded shaft and finger wheel, alternative configurations are contemplated as well. For example, the reciprocating mechanism could be powered by a pneumatic actuator. In such an embodiment, e.g., an element equivalent to the finger wheel could include peripheral teeth, forming a pinion, which would mate with a reciprocatory rack, powered by the pneumatic actuator. Such a reciprocatory rack could also be manually moved, if desired.

Finally, although the invention has been described with reference of particular means, materials and embodiments, it is to be understood that the invention is not limited to the particulars disclosed and extends to all equivalents within the scope of the claims.

What is claimed is:

1. A ribbonizing apparatus for use with a plurality of resin impregnated fiber tows in a fiber placement apparatus, wherein said fiber tows are fed along a plurality of pathways, said ribbonizing apparatus comprising:
    (a) means defining a plurality of laterally adjacent pathways for said plurality of fiber tows;
    (b) means for selectively heating individual ones of said plurality of laterally adjacent fiber tows as said fiber tows extend along respective ones of said laterally adjacent pathways.

2. The ribbonizing apparatus of claim 1, said means for selectively heating comprising (i) means for transferring heat to individual ones of said plurality of fiber tows for controlling width and thickness of said fiber tows and (ii) means for terminating heat transfer to said individual ones of said plurality of fiber tows.

3. The ribbonizing apparatus of claim 1, said means for selectively heating comprising means for effecting selective contact of said individual fiber tows with a source of heat.

4. The ribbonizing apparatus of claim 3, said means for effecting selective contact of said fiber tows comprising means for moving individual ones of said fiber tows, in a direction transverse to said fiber tow path, for contact with said source of heat.

5. The ribbonizing apparatus of claim 4, said source of heat comprising a heating bar extending transversely across said pathways for said plurality of fiber tows, and said means for effecting individual contact comprising means for moving selective ones of said fiber tows for contact with said heating bar.

6. The ribbonizing apparatus of claim 3, said means for effecting contact of said individual fiber tows with a source of heat comprising respective cam members which are selectively rotatable for engaging and moving said individual fiber tows toward said source of heat and away from said source of heat.

7. The ribbonizing apparatus of claim 6, said cam members having heat conductive portions for engaging said tows during movement of said fiber tows toward said source of heat, and having heat insulative portions for engaging said fiber tows when said fiber tows are removed from contact with said source of heat.

8. The ribbonizing apparatus of claim 7, each of said cam members being in driving connection with a respective power actuator assembly for rotating said cam members.

9. The ribbonizing apparatus of claim 8, each of said power actuator assembly comprising an air-actuatable cylinder device.

10. The ribbonizing apparatus of claim 8, each of said cam members having a toothed segment, said power actuator assembly comprising a rack member in engagement with a respective toothed segment for rotating a respective cam member.

11. The ribbonizing apparatus of claim 6, having a pair of cam members for each of said fiber tows, spaced in the direction of a respective one of said fiber tow pathways, said source of heat comprising a heating element positioned between said pair of cam members and adapted to be on an opposite side of said fiber tows from said pair of cam members.

12. The ribbonizing apparatus of claim 3, said means for effecting individual contact of said fiber tows comprising respective bi-metallic elements positioned adjacent respective ones of said fiber tow pathways.

13. The ribbonizing apparatus of claim 12, each of said bi-metallic elements being connected to a source of power and being individually heated for engaging respective fiber tows.

14. The ribbonizing apparatus of claim 13, further comprising a positioning roller and a cooling roller spaced in the direction of said fiber tow pathways, each of said bi-metallic elements being mounted in a bowed configuration projecting in a direction between said positioning roller and said cooling roller.

15. The ribbonizing apparatus of claim 1, said means for individually heating comprising a ceramic tube having grooves for receiving respective ones of said plurality of fiber tows and heating element being provided within each of said grooves.

16. The ribbonizing apparatus of claim 15, further comprising a thermocouple within each groove for monitoring heating of said fiber tows.

17. The ribbonizing apparatus of claim 1 further comprising means for cooling the tows after they are heated.

18. A ribbonizing apparatus for use with a plurality of resin impregnated fiber tows in a fiber placement apparatus, wherein said fiber tows are fed along a predeterminate pathway, said ribbonizing apparatus comprising:

(a) means defining a predeterminate pathway for said plurality of fiber tows, wherein said tows are laterally adjacent;
(b) at least one source of heat to which said plurality of laterally adjacent fiber tows are exposed; and
(c) means for individually exposing said laterally adjacent fiber tows to said at least one source of heat.

19. The ribbonizing apparatus of claim 18, said means defining a plurality of pathways comprising a plurality of bars around which said fiber tows extend, at least one of said bars having a heating element affixed thereto.

20. A ribbonizing apparatus for use with a plurality of resin impregnated fiber tows in a fiber placement apparatus, wherein said fiber tows are fed along a plurality of pathways, said ribbonizing apparatus comprising:

(a) means defining a plurality of laterally adjacent pathways for said plurality of fiber tows;
(b) means for selectively heating respective ones of said plurality of laterally adjacent fiber tows as said fiber tows extend along respective ones of said laterally adjacent pathways;
said means for selectively heating comprising means for effecting selective contact of said fiber tows with a source of heat,
said means for effecting selective contact of said fiber tows comprising means for moving selective ones of said fiber tows, in a direction transverse to said fiber tow path, for contact with said source of heat.

21. The ribbonizing apparatus of claim 20, said plurality of fiber tows extending transversely of said fiber tow pathways, said source of heat comprising a heating bar extending transversely across said plurality of fiber tows, and said means for effecting selective contact comprising means for moving selective ones of said fiber tows for contact with said heating bar.

22. A ribbonizing apparatus for use with a plurality of resin impregnated fiber tows in a fiber placement apparatus, said ribbonizing apparatus comprising:

(a) means defining a plurality of pathways for said plurality of resin impregnated fiber tows;
(b) means for selectively heating respective ones of said plurality of fiber tows as said fiber tows extend along respective ones of said pathways;
said means for selectively heating comprising means for effecting selective contact of said fiber tows with a source of heat, said means for effecting selective contact of said fiber tows comprising respective cam members which are selectively rotatable for engaging and moving respective fiber tows toward said source of heat and away from said source of heat.

23. The ribbonizing apparatus of claim 22, said cam members having heat conductive portions for engaging said tows during movement of said respective fiber tows toward said source of heat, and having heat insulative portions for engaging said respective fiber tows when said fiber tows are removed from contact with said source of heat.

24. The ribbonizing apparatus of claim 23, each of said cam members being in driving connection with a respective power actuator assembly for rotating said cam members.

25. The ribbonizing apparatus of claim 24, each of said power actuator assembly comprising an air-actuatable cylinder device.

26. The ribbonizing apparatus of claim 24, each of said cam members having a toothed segment, said power actuator assembly comprising a rack member in engagement with a respective toothed segment for rotating a respective cam member.

27. The ribbonizing apparatus of claim 22, a pair of cam members for each of said fiber tows, spaced in the direction of a respective one of said fiber tow pathways, said source of heat comprising a heating element positioned between said pair of cam members and adapted to be on an opposite side of said fiber tows from said pair of cam members.

28. A ribbonizing apparatus for use with a plurality of resin impregnated fiber tows in a fiber placement apparatus, said ribbonizing apparatus comprising:

(a) means defining a plurality of pathways for said plurality of resin impregnated fiber tows;
(b) means for selectively heating respective ones of said plurality of fiber tows as said fiber tows extend along respective ones of said pathways, said means for selectively heating comprising a ceramic tube having grooves for receiving respective ones of said plurality of fiber tows and heating element being provided within each of said grooves.

29. The ribbonizing apparatus of claim 28, further comprising a thermocouple within each groove for monitoring heating of said fiber tows.

* * * * *